United States Patent [19]

Bardos et al.

[11] Patent Number: 5,170,095
[45] Date of Patent: Dec. 8, 1992

[54] LOW-PRESSURE MERCURY VAPOR DISCHARGE LIGHT SOURCE OF HIGH WALL LOADABILITY

[75] Inventors: György Bardos; Istvánné Cserteg, both of Budapest, Hungary

[73] Assignee: Tungsram Reszvenytarsasag, Budapest, Hungary

[21] Appl. No.: 813,944

[22] Filed: Dec. 24, 1991

Related U.S. Application Data

[63] Continuation of Ser. No. 483,072, Feb. 21, 1990, abandoned.

[30] Foreign Application Priority Data

Feb. 24, 1989 [HU] Hungary ................................. 877/89

[51] Int. Cl.⁵ .......................... H01J 1/63; C09K 11/71
[52] U.S. Cl. ..................... 313/486; 313/487; 313/490; 252/301.4 P; 252/301.6 P
[58] Field of Search ............. 313/486, 487, 490; 252/301.4 P, 301.6 P

[56] References Cited

U.S. PATENT DOCUMENTS

| | | | |
|---|---|---|---|
| 3,351,796 | 11/1967 | Apple et al. | 252/301.4 P X |
| 3,636,352 | 1/1972 | Wanmaker et al. | 252/301.4 P |
| 3,886,396 | 5/1975 | Hammer et al. | 313/488 X |
| 3,887,725 | 6/1975 | Halsteads, Jr. et al. | 252/301.6 P X |
| 3,927,240 | 12/1975 | Hammond et al. | 252/301.4 P X |
| 4,331,553 | 5/1982 | Fan et al. | 252/301.4 P X |
| 4,335,330 | 6/1982 | Peters et al. | 313/486 |
| 4,384,237 | 5/1983 | Taubner et al. | 313/486 |
| 4,420,709 | 12/1983 | Rattray | 313/487 X |
| 4,890,033 | 12/1989 | Ichinomiya et al. | 313/485 X |
| 4,891,550 | 1/1990 | Northrop et al. | 313/487 |

FOREIGN PATENT DOCUMENTS

| | | | |
|---|---|---|---|
| 1184966 | 4/1985 | Canada | 313/487 |
| 0181471 | 8/1985 | Hungary . | |
| 0018092 | 5/1974 | Japan . | |
| 0069483 | 6/1978 | Japan . | |
| 1191974 | 5/1970 | United Kingdom . | |
| 1229038 | 4/1971 | United Kingdom . | |
| 1343250 | 1/1974 | United Kingdom . | |
| 1496438 | 12/1977 | United Kingdom . | |
| 2082618 | 3/1982 | United Kingdom . | |

*Primary Examiner*—Donald J. Yusko
*Assistant Examiner*—Ashok Patel
*Attorney, Agent, or Firm*—Handal & Morofsky

[57] ABSTRACT

A low-pressure mercury vapor fluorescent lamp has a luminescent coating including a small quantity of a fine grain inactive material such as a calcium, strontium or barium chloroapatite, which inactive material has a surplus of a metallic cation giving the coating a net positive charge to deter absorption of mercury ions and prolong the life of the lamp.

11 Claims, 1 Drawing Sheet

LOW-PRESSURE MERCURY VAPOR DISCHARGE LIGHT SOURCE OF HIGH WALL LOADABILITY

This application is a continuation of application Ser. No. 07/483,072, filed Feb. 21, 1990 now abandoned.

FIELD OF THE INVENTION

The present invention refers to a low-pressure mercury vapour discharge light source, particularly a luminescence lamp and especially a fluorescent lamp of high wall loadability with a luminescent coating comprising an inactive component and a luminescent composition for preparing a low-pressure mercury vapour discharge light source.

BACKGROUND OF THE INVENTION

The low-pressure mercury vapour discharge light sources made with a luminescent coating, particularly the fluorescent lamps show the drawback that their luminous flux generally decreases with increasing work time. The intensity of this process depends on the kind of the light source and especially on the type of the luminescent material applied. Lots of methods were reported for diminishing the intensity, and particularly for avoiding this process. The methods forming the art are, however, different because the processes themselves differ from one another, as it is described e.g. in the introductory part of the GB-PS 1,343,250.

One of the most important factors influencing the intensity of the process mentioned is that the luminescent material is electrically not fully neutral. This follows from the fact that activating ions should be introduced into the crystalline lattice of the crystalline substance being the basis of the luminescent material. The presence of the activating ions is necessary for ensuring radiation of light characterized with the required wavelength. The excitation of the luminescent material is generally caused by the ultraviolet radiation of the mercury vapour taking part in the discharge process.

The activating ions can be introduced into the crystalline lattice in a relatively sophisticated manner which generally requires the application of anions in a surplus for ensuring the stability of the luminescent material. The surplus is related to the stoichiometric amounts and it results in the negative charge of the stabilized luminescent material. The luminescent material having negative charge attracts the mercury ions having positive charge and being present in the discharge space. The mercury ions are absorbed on the surface of the luminescent material and cause turning its colour to grey. In another process the luminescent material receives the mercury ions and the ions make the cations of higher electronegativity leave the material as described in the specification of the Hungarian Patent No. 181,471 granted to N. V. Philips Gloeilampenfabrieken, Eindhoven (Holland), on the basis of an application derived from the application NL-77.09263 filed on Aug. 23, 1977. The disadvantage of this process is that the luminous flux emitted by the light source is slowly decreasing, the light source can not ensure the light efficiency following from the physical features of the luminescent material when applying the prescribed other, particularly electric parameters. This process is shown among others in the GB-PS 1,229,038 with reference to the silicate based luminescent materials wherein the specification mentions that for diminishing the extent of the process of absorbing mercury it is advantageous to decrease the surplus of the silicon dioxide. Therefore zinc borate of specific composition including a surplus of zinc oxide is mixed with the luminescent material of known composition. The blend should undergo a heat treatment for assuring its desired structure and composition. The method is relatively sophisticated and requires parameters to be controlled with high accuracy. A further drawback is linked with the presence of zinc which is disadvantageous as analysed in the HU-PS 181,471.

An improvement of the features of the calcium halophosphate luminescent material and especially slowing down the decrease of the luminous flux was proposed according to the specification of U.S. Pat. No. 3,887,725 disclosing the step of preparing a surface layer on the grains of the luminescent material by preparing a blend with the luminescent material having known composition and zinc orthophosphate or zinc borate forming a coating component. In this method the presence of zinc is disadvantageous as it was analysed in the HU-PS 181,471 cited above. The zinc component deteriorates the stability of the luminescent material against the high energy mercury ions of positive charge. Therefore it is desired to avoid the use of luminescent materials including zinc in the fluorescent tubes of small dimensions.

Another useful proposal became known from the GB-PS 1,191,974 wherein a method for "in situ" preparing a phosphate layer on the surface of the calcium halophosphate grains is shown, the method being based on a chemical process. Another chemical process resulting in similar phosphate coating can be found in the GB-PS 1,343,250 with the difference that the grains consist of a silicate type luminescent material.

The methods of preparing a coating give acceptable results. There is, however, no change with the respect that the negative charge of the surface of the luminescent material remains, and the problems linked with this fact can not be avoided in this way.

OBJECT OF THE INVENTION

The present invention is based on the recognition that the process of adsorbing mercury can be avoided with highest reliability if the originally negative charge of the surface of the luminescent material is compensated, or what more, this surface is given positive electric charge. The positive electric charge of the surface can be ensured by filling the surface of the luminescent material by a stabilized component having positive charge. In this way the possibility is excluded that the luminescent material covering the inner surface of the vessel of the gas discharge light source attracts the high energy mercury ions having positive charge. In this way the process of diminishing the luminous flux of the gas discharge light source can be avoided or slowed down when applying the luminescent material proposed by the application.

The recognition means that the basic luminescent material of known composition should be completed with a substance ground to very high fineness, being free of an activating component and showing a slight surplus of cations when compared to the stoichiometric amounts. The inner surface of the vessel of a gas discharge light source which is particularly a fluorescent tube, especially a fluorescent tube of high wall loadability should be covered by this novel luminescent material including the novel inactive component.

The compounds comprising a luminescent material and an inactive component are known, per se. Such solutions are disclosed in lots of patent documents, the most important seem to be the following: U.S. Pat. No. 3,310,418; U.S. Pat. No. 3,886,396; GB-PS 1,496,438; GB-PS 2,082,618 and JP-B-49-18092, further JP-B-53-69483. The inactive components mentioned in the documents cited are the magnesium oxide, aluminium oxide, silicon dioxide and calcium diphosphate. They are either to ensure a reliable connection between the layer of the luminescent material and the inner surface of the vessel, similarly to a gluing component, or to influence the behaviour of the coating against ultraviolet radiation: either to filter, absorb or to reflect this kind of radiation.

Of course, the inactive components listed up above are white in order to diminish the loss of the luminous flux emitted by the discharge light source. The documents cited do not mention that the inactive component should be present in the luminescent material with a slight surplus of cations in order to compensate the negative charge of the anion surplus in the basic luminescent material.

It is obvious that after the treatment as proposed by the present invention the inactive component carrying positive charge due to the cation surplus is linked with those of the nodules of the basic luminescent material which are negatively charged. In this way the nodules are inactivated, they are not capable of receiving the mercury ions. This is a kind of protection of the luminescent material against being bombarded by the mercury ions which is especially important in the case of the fluorescent tubes of small dimensions, i.e. in the compact tubes wherein the processes mentioned are dominant. The investigations gave evidence that the best inactive components are the diphosphates and/or the tetraborates of the alkali earth metals. The mentioned substances can be applied alone or together.

Hence, the object of the present invention is a low-pressure mercury vapour discharge light source, particularly a fluorescent lamp and especially a fluorescent lamp of high wall loadability with luminescent coating including an inactive component, comprising a vessel prepared on its inner surface with a luminescent coating including an inactive component, the vessel being pervious to radiation of predetermined wavelength, an excitable and ionizable filling consisted of a rare gas and mercury, the filling being arranged within the vessel and means for maintaining a gas discharge process within the vessel. According to the invention the inactive component contains grains of average size smaller than the average size of the grains forming the luminescent coating, wherein the inactive component has positive electric charge and its amount lies in the range of about 0.1 mass % to about 2 mass % when compared to the amount of the luminescent coating. It is preferred when the average size of the grains of the inactive component in the range of about 0.0005 to about 0.0001 mm.

In the low-pressure mercury vapour discharge light source the inactive component is preferably a compound determined by the general formula $M_x(P_2O_7)_y(B_4O_7)_z$, wherein M means at least one metal selected from the group consisted of calcium, strontium and barium, z lies in the range of at least 0 to at most 1, y fulfills the equation $y=1-z$ and x in the range of about $1.05(2y+z)$ to $1.15(2y+z)$. In a further advantageous embodiment of the source proposed the inactive component is arranged in close conection with the surface of the grains forming the luminescent coating, i.e. in a surface layer of the grains of the luminescent component or as a layer covering the last.

In a yet further advantageous embodiment of the low-pressure mercury vapour discharge light source realized according to the invention the luminescent coating includes at least one luminescent component consisted of a halophosphate of apatite structure, preferably of strontium chloroapatite activated by europium wherein the inactive component consists of grains of average size in the range of about 0.0005 mm to about 0.0001 mm and of composition determined by the general formula $(Ca,Sr)_xP_2O_7$, advantageously $Ca_xP_2O_7$ wherein x lies in the range of about 2.0 to 2.3, advantageously of about 2.1 to about 2.2.

Another object of the present invention is a luminescent composition for preparing a low-pressure mercury vapour discharge light source, consisting of at least one luminescent component and an inactive component. The essence of the invention is that the inactive component is consisted of grains of average size in preferred range of 0.0005 mm to about 0.0001 mm being smaller than the average size of the grains constituting the luminescent component(s), the inactive component carrying positive electric charge, wherein the amount of the inactive component lies in the range of about 0.1 mass % to about 2 mass % when compared to that of the mass of the luminescent component(s).

It is preferred when in the luminescent composition proposed by the invention the inactive component is a compound described by the general formula $M_x(P_2O_7)_y(B_4O_7)_z$, wherein M means at least one metal selected from the group consisted of calcium, strontium and barium, $y=1-z$, z lies in the range of at least 0 to at most 1 and x in the value range of about $1.05(2y+z)$ to about $1.15(2y+z)$.

In a further embodiment of the luminescent composition of the invention the at least one luminescent component consists of halophosphate of apatite structure, preferably of strontium chloroapatite activated by europium, the inactive component consists of grains of average size in the range of 0.0005 mm to 0.0001 mm, and of composition determined by the general formula $(Ca,Sr)_xP_2O_7$, advantageously $Ca_xP_2O_7$, wherein x is in the range of about 2.0 to about 2.3, advantageously of about 2.1 to about 2.2.

SHORT DESCRIPTION OF THE DRAWING

The invention will be further described by way of example only by presenting some preferred embodiments with reference to the enclosed drawing. In the drawing FIG. 1 shows a schematic cross-section of a compact fluorescent tube broken in the middle part in longitudinal direction, and FIG. 2 represents a cross-section of a luminescent tube for general lighting purposes, the tube broken out in the middle part in longitudinal direction.

DETAILED DESCRIPTION OF THE PREFERRED EMBODIMENTS

Figure 1:
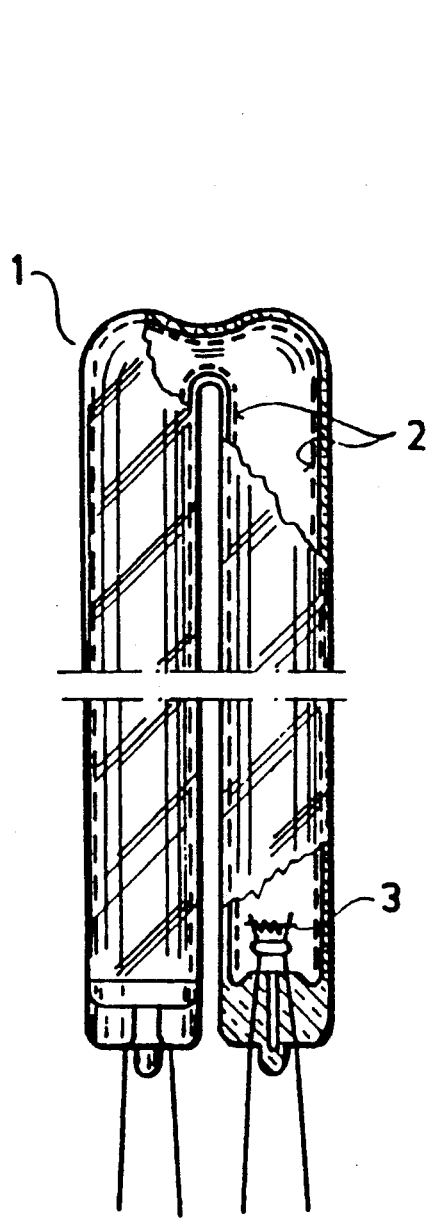

The present invention is applied for improving the luminous flux of fluorescent tubes of known designs. The invention has no consequence in any modification of the basic structure of the low-pressure mercury vapour discharge tubes comprising in this case also a vessel 1 made generally of glass and means 3 for maintaining a discharge process within the vessel 1. The inner surface of the vessel 1 is covered by a luminescent coating 2 of novel features and the essence of the invention lies in the composition of the luminescent coating 2.

The luminescent coating of the invention includes a luminescent composition for preparing a low-pressure mercury vapour discharge light source, consisting of at least one luminescent component and an inactive component. The inactive component is consisted of grains of average size in preferred range of about 0.0005 mm to about 0.0001 mm which should be smaller than the average size of the grains forming the luminescent component(s). It is very important that the inactive component carries positive electric charge, and its amount lies in the range of about 0.1 mass % to about 2 mass % when compared to that of the mass of the luminescent component(s). The grains of the inactive component should preferably be homogeneously dispergated in the mass of the luminescent component(s), advantageously in close surface connection with the grains of the luminescent component(s).

According to the investigations the most preferred solution is when the inactive component is a compound determined by the general formula $M_x(P_2O_7)_y(B_4O_7)_z$, wherein M means at least one metal selected from the group consisted of calcium, strontium and barium, and further $y = 1 - z,$ $0 \leq z \leq 1$, and $1.05(2y+z) \leq x \leq 1.15(2y+z).$ In the proposed composition at least one luminescent component preferably consists of halophosphate of apatite structure, as strontium chloroapatite activated by europium, the inactive component consists of grains of average size in the range of 0.0005 to 0.0001 mm, and of composition determined by the general formula $(Ca,Sr)_xP_2O_7$, preferably $Ca_xP_2O_7$, wherein x is in the range of about 2.0 to about 2.3, advantageously of about 2.1 to about 2.2. The last range is especially preferred when the metal M of the general formula is calcium.

The invention will be further described in more detail on the basis of examples.

EXAMPLE 1

Preparing the inactive component of composition $Ca_{2.1}P_2O_7$ 272 g $CaHPO_4$ and 20 g $CaCO_3$ were mixed and the blend was homogenized for obtaining a homogeneous distribution of the components. The homogenized blend was arranged in a quartz crucible and heated together with the crucible in a furnace to a final heating temperature in the range of about 1050° C. to about 1100° C. The temperature was maintained in this range for 1 hour. The furnace was then turned off and allowed to cool to the ambient temperature before the material was removed. The product thus received was then ground to the desired graininess.

EXAMPLE 2

Preparing the inactive component of composition $Ca_{1.65}(P_2O_7)_{0.5}(B_4O_7)_{0.5}$ 136 g $CaHPO_4$, 139 g $B_2O_3$ and 65 g $CaCO_3$ were mixed and the blend was homogenized for obtaining a homogeneous distribution of the components. The homogenized blend was arranged in a corundum crucible and heated up together with the crucible in a furnace at a rate of about 7.5° C. per minute to the final heating temperature about 900° C. The temperature was maintained in this range for 2 hours. The furnace was then turned off and allowed to cool to the ambient temperature before the material was removed. The product thus received was then ground to the desired graininess.

EXAMPLE 3

Preparing a luminescent coating composition for compact fluorescent tubes emitting blue light The luminescent material of the fluorescent tubes emitting blue light is strontium chloroapatite activated by europium. This material should be completed with an inactive component. The procedure was the following:

200 g luminescent material were dispersed in 180 g binder (butyl acetate comprising 1 vol. % nitrocellulose). From the same binder a suspension was prepared containing 15 vol. % calcium diphosphate forming the inactive component according to Example 1. 14 g of this suspension were added to the mixture of the binder and the luminescent material. In this case the inactive component constituted a part of about 1 mass. % in the luminscent caoting and this was the percentage of that component of the coating which had positive electric charge.

The mixture of the suspension and the dispergated luminescent material was applied for preparing a compact fluorescent tube built up according to FIG. 1. The tube of 5 W power contained a coating having mass about 0.14 g.

Simultaneously another fluorescent tube was also manufactured with the only difference that the luminescent coating was free of the inactive component. This was the control tube.

Both fluorescent tubes were then connected to electric power supply and the luminous flux emitted was measured as the intensity of the light source. The comparative data expressed in relative units were the following (see Table 1):

TABLE 1

|  | Intensity after | | Decrease of the intensity, |
| --- | --- | --- | --- |
|  | 0 h | 100 h | % |
| Fluorescent tube with novel coating | 95 | 88 | 7.4 |
| Control tube | 100 | 82 | 18.0 |

The example shows that the decrease of the luminous flux, i.e. the intensity of the light emitted by the tube during its life is much smaller than in when the luminescent coating of novel composition is applied. This is especially important in the case of the compact fluorescent tubes.

EXAMPLE 4

Preparing a luminescent coating composition comprising an inactive component and a calcium fluorochlorophosphate:Mn,Sb luminescent component for usual fluorescent tubes 400 g luminescent component of the above composition was dispergated in 360 g binder based on water. The mixture received by dispergation was completed with 27 g suspension comprising 15 mass % inactive component of the composition determined by the formula $Ca_{1.1}Sr_{1.1}P_2O_7$. The composition obtained in this way comprised about 1 mass % inactive component.

The composition constituted material of pasty consistance.

Figure 2:
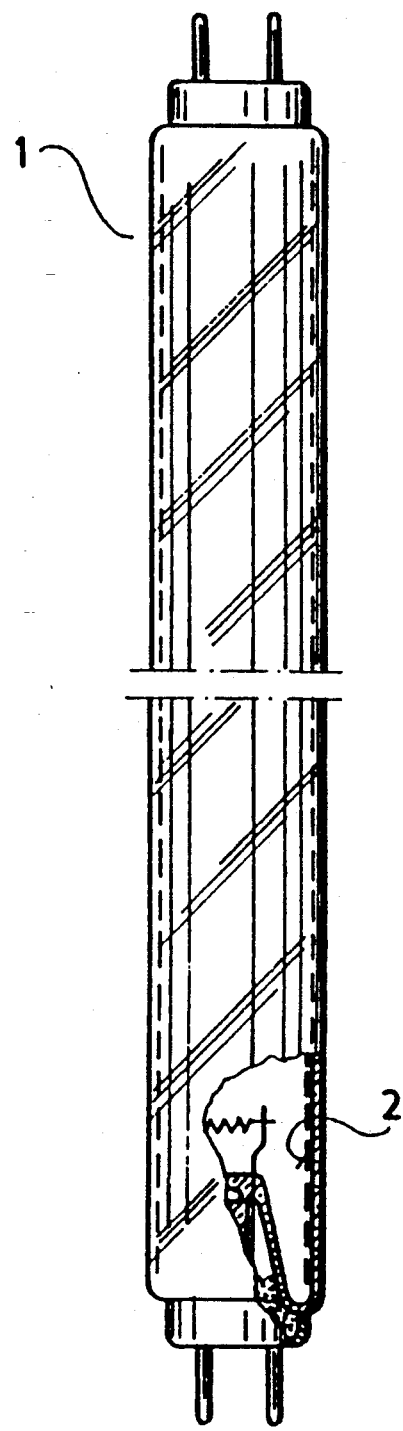

On the basis of the coating composition comprising the inactive component a fluorescent tube of 36 W power and 26 mm diameter was prepared. The tube was built up according to FIG. 2. Simultaneously a fluorescent tube of the same construction was manufactured without the inactive component in the luminescent coating. This was the control tube.

The tubes were connected to electric supply and they worked 500 h. The intensity of the luminous flux emitted by the tubes was measured and expressed in relative (percentage) units, wherein the intensity of the control tube was assigned to 100. The measurements gave the following results:

TABLE 2

|  | Intensity after | | | Decrease of the intensity, % | |
| --- | --- | --- | --- | --- | --- |
|  | 0 h | 100 h | 500 h | 100 h | 500 h |
| Fluorescent tube with novel coating | 99 | 97.0 | 95 | 2 | 2 |
| Control tube | 100 | 97.0 | 93 | 3 | 4 |

The decrease assigned to 500 h was computed on the basis of the decrease measured after 100 h.

The intensity values are generally the same after 100 h. The further operation of the tubes gave an evidence that the novel coating is better than the coating prepared according to the art.

EXAMPLE 5

Preparing a luminescent coating composition comprising an inactive component and a calcium fluorochlorophosphate:Mn,Sb luminescent component for usual fluorescent tubes 400 g luminescent component of the above composition (4200K) was dispergated in 36 g binder solution based on butyl acetate (comprising 1 vol. % nitrocellulose). The mixture received by dispergation was completed with 27 g suspension comprising 15 mass % inactive component of the composition determined by the formula $Ca_{1.65}(P_2O_7)_{0.5}(B_4O_7)_{0.5}$ as described in Example 2. The composition obtained in this way comprised about 1 mass % inactive component.

The composition constituted material of pasty consistence.

On the basis of the coating composition comprising the inactive component a fluorescent tube of 40 W power and 38 mm diameter was prepared. The tube was built up according to FIG. 2. Simultaneuously a fluorescent tube of the same construction was manufactured without the inactive component in the luminescent coating. This was the control tube.

The tubes were connected to electric supply and they worked 500 h. The intensity of the luminous flux emitted by the tubes was measured at the beginning, after 100 h and 500 h operation. The values were expressed in relative (percentage) units, wherein the intensity of the control tube was assigned to 100. The measurements gave the following results:

TABLE 3

|  | Intensity after | | | Decrease of the intensity, % | |
| --- | --- | --- | --- | --- | --- |
|  | 0 h | 100 h | 500 h | 100 h | 500 h |
| Fluorescent tube with novel coating | 98 | 97.4 | 96.4 | 0.6 | 1.0 |
| Control tube | 100 | 97.4 | 94.1 | 2.6 | 3.4 |

The decrease assigned to 500 h was computed on the basis of the decrease measured after 100 h.

The intensity values are generally the same after 100 h. The further operation of the tubes gave an evidence that the novel coating is better than the coating prepared according to the art.

The examples given above proved the positive effect of the luminescent coatings comprising according to the invention an inactive component, especially in fluorescent tubes emitting blue light. It is obvious that this effect is valid also in the case of luminescent coatings consisted of several components. The luminescent composition applied in fluorescent tubes emitting blue light is the most characteristic because in the tubes of this kind the adsorption of mercury is the most intensive among the fluorescent tubes. Hence, the process of avoiding adsorption of mercury is the most important in the tubes emitting blue light.

The essence of the present invention is to prepare the luminescent coating with an inactive component carrying positive electric charge. Only the components charged positively can offer the required effect. The measurements gave an evidence that the novel coating composition, i.e. the cation surplus resulted in pratically no deterioration of the lighting parameters of the fluorescent tubes.

However, the invention was shown above with special reference to some embodiments regarded to be very advantageous it is not intended to be restricted to the solutions following from the examples given. The scope of the protection is determined by the attached claims and it is obvious that the invention can be realized in other ways also as shown in the examples. It may be noted the aluminates or silicates of the alkali earth metals themselves or in combination with the substances specified above can be applied with the same positive result.

What we claim is:

1. A low-pressure mercury vapor discharge light source being a fluorescent lamp of high wall loadability with a luminescent coating comprising a luminescent material having a surplus of activating anions, said surplus of activating anions providing said luminescent material with a negative charge, said luminescent coating further comprising an inactive component, said lamp being pervious to a radiation of predetermined wavelength and comprising an excitable and ionizable filling consisting of a rare gas and mercury, said filling being arranged within said lamp and comprising means for maintaining a gas discharge within said lamp, wherein said inactive component consists of grains of average size smaller than that of grains forming said luminescent coating to be able to provide a protective layer on said grains, said inactive component containing a surplus of a metallic cation thereby to be positively charged and wherein an amount of said inactive component lies in a range of about 0.1 mass % to about 2 mass % when compared to that of said luminescent coating, whereby an anion surplus in said luminescent coating is compensated and said luminescent coating has a net positive charge to deter absorption of mercury ions.

2. A low-pressure mercury vapor discharge light source as set forth in claim 1 wherein said average size of said grains of said inactive component lies in a range of from about 0.5 to about 0.1 μm.

3. A low-pressure mercury vapor discharge light source as set forth in claim 1, wherein said inactive component is a compound determined by a general formula $M_x(P_2O_7)_y(B_4O_7)_z$, wherein M means at least one metal selected from a group consisting of calcium, strontium and barium, $y=1-z$, z lies in a range of 0 to 1 and x lies in a range of about $1.05(2y+z)$ to about $1.15(2y+z)$.

4. A low-pressure mercury vapor discharge light source as set forth in claim 1, wherein said luminescent coating includes at least one luminescent component consisting of a halophosphate of apatite structure, wherein said inactive component consists of grains of average size in a range of from about 0.5 μm to about 0.1 μm and of composition determined by a general formula $(Ca,Sr)_xP_2O_7$ wherein x lies in a range of about 2.1 to about 2.3.

5. A low-pressure mercury vapor discharge light source as set forth in claim 4, wherein said luminescent coating includes said at least one luminescent component consisting of strontium chloroapatite activated by europium, said inactive component consisting of grains of composition determined by a general formula $Ca_xP_2O_7$ wherein x lies in a range of about 2.1 to about 2.2.

6. A luminescent composition for a low-pressure mercury vapor discharge light source, which composition comprises at least one luminescent component, said luminescent component having a surplus of activating anions providing said luminescent component with a negative charge, said luminescent composition also including an inactive component, wherein said inactive component has grains of average size smaller than that of grains forming said luminescent component to be able to provide a protective layer on said grains, said inactive component containing a surplus of a metallic cation thereby to be positively charged and wherein an amount of said inactive component lies in a range of about 0.1 mass % to about 2 mass % when compared to that of said luminescent component whereby an anion surplus in said luminescent component is compensated and said luminescent coating has a net positive charge to deter absorption of mercury ions.

7. A luminescent composition as set forth in claim 6, wherein said average size of said grains of said inactive component lies in a range of about 0.5 μm to about 0.1 μm.

8. A luminescent composition as set forth in claim 6, wherein said inactive component is a compound determined by a general formula $M_x(P_2O_7)_y(B_4O_7)_z$, wherein M means at least one metal selected from a group consisting of calcium, strontium and barium, $y=1-z$, z lies in a range of 0 to 1 and x in a range of about $1.05(2y+z)$ to about $1.15(2y+z)$.

9. A luminescent composition as set forth in claim 6, wherein said at least one luminescent component consists of a halophosphate of apatite structure, said inactive component consists of grains of average size in a range of from about 0.5 μm to about 0.1 μm and of composition determined by a general formula $(Ca,Sr)_xP_2O_7$ wherein x lies in a range of about 2.1 to about 2.3.

10. A luminescent composition as set forth in claim 9, wherein said at least one luminescent component consists of strontium chloroapatite activated by europium, and said inactive component consists of grains of composition determined by a general formula $Ca_xP_2O_7$ with values of x lying in a range of about 2.1 to about 2.2.

11. A low-pressure mercury vapor discharge fluorescent lamp of high wall loadability, said lamp having a wall pervious to radiation of predetermined wavelength, having an excitable and ionizable filling consisting of a rare gas and mercury, and having means for maintaining a gas discharge within said lamp, wherein said wall has an inner surface and a luminescent coating disposed on said inner surface which luminescent coating comprises:
   a) a granular luminescent material having a surplus of activating anions providing said luminescent material with a negative charge; and
   b) an inactive component in an amount ranging from about 0.1 mass % to about 2 mass % of said luminescent coating, said inactive component consisting of grains of an average size in a range of from about 0.5 μm to about 0.1 μm;
whereby said inactive component provides a protective layer on said granular luminescent material and said inactive component is a compound determined by a general formula $M_x(P_2O_7)_y(B_4O_7)_z$, wherein M means at least one metal selected from a group consisting of calcium, strontium and barium, $y=1-z$, z lies in a range of 0 to 1 and x lies in a range of about $1.05(2y+z)$ to about $1.15(2y+z)$ thereby to contain a surplus of a metallic cation and to be positively charged said luminescent coating having a net positive charge to deter absorption of mercury ions.

* * * * *